United States Patent [19]

Kurtz et al.

[11] 4,282,177
[45] * Aug. 4, 1981

[54] METHOD FOR REDUCING SHARKSKIN MELT FRACTURE DURING EXTRUSION OF ETHYLENE POLYMERS

[75] Inventors: Stuart J. Kurtz, Martinsville; Theodore R. Blakeslee, III, Hillsborough; Leonard S. Scarola, Union, all of N.J.

[73] Assignee: Union Carbide Corporation, New York, N.Y.

[ * ] Notice: The portion of the term of this patent subsequent to May 12, 1998, has been disclaimed.

[21] Appl. No.: 99,061

[22] Filed: Dec. 12, 1979

Related U.S. Application Data

[63] Continuation-in-part of Ser. No. 1,932, Jan. 8, 1979.

[51] Int. Cl.$^3$ ............................................. B29D 23/04
[52] U.S. Cl. ............................... 264/564; 264/176 R; 264/209; 264/216; 425/326.1; 425/461; 526/124
[58] Field of Search ............... 264/564, 563, 209, 216, 264/176 R, 177 R; 425/381, 376 R, 376 A, 461, 326.1; 526/124

[56] References Cited

U.S. PATENT DOCUMENTS

| | | | |
|---|---|---|---|
| 3,376,605 | 4/1968 | Beattie | 425/376 R |
| 3,382,535 | 5/1968 | Ferrari | 425/461 |
| 3,874,837 | 4/1975 | Jamieson | 425/461 |
| 3,879,507 | 4/1975 | Cavanna | 264/51 |
| 3,914,366 | 10/1975 | Wilson | 264/177 R |
| 3,920,782 | 11/1975 | Cogswell | 264/176 R |
| 3,994,654 | 11/1976 | Chyu | 425/376 R |
| 4,187,269 | 2/1980 | Hutchinson et al. | 264/209 |

*Primary Examiner*—Jeffery R. Thurlow
*Attorney, Agent, or Firm*—Clement J. Vicari

[57] ABSTRACT

A method for reducing sharkskin melt fracture during extrusion of a molten narrow molecular weight distribution linear ethylene polymer which comprises extruding said polymer through a die having a die gap greater than about 50 mils and wherein at least a portion of one surface of the die lip and/or die land in contact with the molten polymer is at an angle of divergence or convergence relative to the axis of flow of the molten polymer through the die.

16 Claims, 7 Drawing Figures

FIG. 3iii

METHOD FOR REDUCING SHARKSKIN MELT FRACTURE DURING EXTRUSION OF ETHYLENE POLYMERS

CROSS REFERENCES TO RELATED PATENT APPLICATIONS

This patent application is a continuation-in-part of application Ser. No. 001,932 filed Jan. 8, 1979.

FIELD OF THE INVENTION

This invention relates to a method for reducing melt fracture, particularly sharkskin melt fracture, during extrusion of a molten narrow molecular weight distribution, linear, ethylene polymer, under conditions of flow rate and melt temperature which would otherwise produce such melt fracture, which method comprises extruding said polymer through a die having a die gap greater than about 50 mils and wherein at least a portion of one surface of the die lip and/or die land in contact with the molten polymer is at an angle of divergence or convergence, relative to the axis of flow of the molten polymer through the die.

BACKGROUND OF THE INVENTION

Most commercial low density polyethylenes are polymerized in heavy walled autoclaves or tubular reactors at pressures as high as 50,000 psi and temperatures up to 300° C. The molecular structure of high pressure low density polyethylene is highly complex. The permutations in the arrangement of its simple building blocks are essentially infinite. High pressure resins are characterized by an intricate long chain branched molecular architecture. These long chain branches have a dramatic effect on the melt rheology of the resins. High pressure low density polyethylene resins also possess a spectrum of short chain branches generally 1 to 6 carbon atoms in length which control resin crystallinity (density). The frequency distribution of these short chain branches is such that, on the average, most chains possess the same average number of branches. The short chain branching distribution characterizing high pressure low density polyethylene can be considered narrow.

Low density polyethylene can exhibit a multitude of properties. It is flexible and has a good balance of mechanical properties such as tensile strength, impact resistance, burst strength, and tear strength. In addition, it retains its strength down to relatively low temperatures. Certain resins do not embrittle at temperatures as low as −70° C. Low density polyethylene has good chemical resistance, and it is relatively inert to acids, alkalis, and inorganic solutions. It is, however, sensitive to hydrocarbons, halogenated hydrocarbons, and to oils and greases. Low density polyethylene has excellent dielectric strength.

More than 50% of all low density polyethylene is processed into film. This film is primarily utilized in packaging applications such as for meat, produce, frozen food, ice bags, boilable pouches, textile and paper products, rack merchandise, industrial liners, shipping sacks, pallet stretch and shrink wrap. Large quantities of wide heavy gage film are used in construction and agriculture.

Most low density polyethylene film is produced by the tubular blown film extrusion process. Film products made by this process range, in size, from tubes which are about two inches or less in diameter, and which are used as sleeves or pouches, to huge bubbles that provide a lay flat of up to about twenty feet in width, and which, when slit along an edge and opened up, will measure up to about forty feet in width.

Polyethylene can also be produced at low to medium pressures by homopolymerizing ethylene or copolymerizing ethylene with various alpha-olefins using heterogeneous catalysts based on transition metal compounds of variable valence. These resins generally possess little, if any, long chain branching and the only branching to speak of is short chain branching. Branch length is controlled by comonomer type. Branch frequency is controlled by the concentration of comonomer(s) used during copolymerization. Branch frequency distribution is influenced by the nature of the transition metal catalyst used during the copolymerization process. The short chain branching distribution characterizing transition metal catalyzed low density polyethylene can be very broad.

U.S. patent application Ser. No. 892,325 filed Mar. 3, 1978, now abandoned and refiled as Ser. No. 014,414 on Feb. 27, 1979, in the names of F. J. Karol et al and entitled Preparation of Ethylene Copolymers In Fluid Bed Reactor, discloses that ethylene copolymers, having a density of 0.91 to 0.96, a melt flow ratio of $\geq 22$ to $\leq 32$ and a relatively low residual catalyst content can be produced in granular form, at relatively high productivities if the monomer(s) are copolymerized in a gas phase process with a specific high activity Mg-Ti containing complex catalyst which is blended with an inert carrier material.

U.S. patent application Ser. No. 892,322 filed Mar. 31, 1978, abandoned and refiled as Ser. No. 012,720 on Feb. 16, 1979, in the names of G. L. Goeke et al and entitled Impregnated Polymerization Catalyst, Process For Preparing, and Use For Ethylene Copolymerization discloses that ethylene copolymers, having a density of 0.91 to 0.96, a melt flow ratio of $\geq 22$ to $\leq 32$ and a relatively low residual catalyst content can be produced in granular form, at relatively high productivities, if the monomer(s) are copolymerized in a gas phase process with a specific high-activity Mg-Ti-containing complex catalyst which is impregnated in a porous inert carrier material.

U.S. patent application Ser. No. 892,037 filed Mar. 31, 1978, now abandoned and refiled as Ser. No. 014,412 on Feb. 27, 1979, in the names of B. E. Wagner et al and entitled Polymerization Catalyst, Process For Preparing And Use For Ethylene Homopolymerization, discloses that ethylene homopolymers having a density of about $\geq 0.958$ to $\leq 0.972$ and a melt flow ratio of about $\geq 22$ to about $\leq 32$ which have a relatively low residual catalyst residue can be produced at relatively high productivities for commercial purposes by a low pressure gas phase process if the ethylene is homopolymerized in the presence of a high-activity Mg-Ti-containing complex catalyst which is blended with an inert carrier material. The granular polymers thus produced are useful for a variety of end-use applications.

The polymers as produced, for example, by the processes of said applications using the Mg-Ti containing complex catalyst possess a narrow molecular weight distribution, Mw/Mn, of about $\geq 2.7$ to $\leq 4.1$.

LOW DENSITY POLYETHYLENE:RHEOLOGY

The rheology of polymeric materials depends to a large extent on molecular weight and molecular weight distribution.

In film extrusion, two aspects of rheological behavior are important: shear and extension. Within a film extruder and extrusion die, a polymeric melt undergoes severe shearing deformation. As the extrusion screw pumps the melt to, and through, the film die, the melt experiences a wide range of shear rates. Most film extrusion processes are thought to expose the melt to shear at rates in the 100-5000 sec$^{-1}$ range. Polymeric melts are known to exhibit what is commonly termed shear thinning behavior, i.e., non-Newtonian flow behavior. As shear rate is increased, viscosity (the ratio of shear stress, $\tau$, to shear rate, $\dot{\gamma}$) decreases. The degree of viscosity decrease depends upon the molecular weight, its distribution, and molecular configuration, i.e., long chain branching of the polymeric material. Short chain branching has little effect on shear viscosity. In general, high pressure low density polyethylenes have a broad molecular weight distribution and show enhanced shear thinning behavior in the shear rate range common to film extrusion. The narrow molecular weight distribution resins used in the present invention exhibit reduced shear thinning behavior at extrusion grade shear rates. The consequences of these differences are that the narrow distribution resins used in the present invention require higher power and develop higher pressures during extrusion than the high pressure low density polyethylene resins of broad molecular weight distribution and of equivalent average molecular weight.

The rheology of polymeric materials is customarily studied in shear deformation. In simple shear the velocity gradient of the deforming resin is perpendicular to the flow direction. The mode of deformation is experimentally convenient but does not convey the essential information for understanding material response in film fabrication processes. As one can define a shear viscosity in terms of shear stress and shear rate, i.e.:

$\eta shear = \tau_{12}/\dot{\gamma}$ where $\eta shear$ = shear viscosity (poise)
$\tau 12$ = shear stress (dynes/cm$^2$)
$\dot{\gamma}$ = shear rate (sec$^{-1}$) an extensional viscosity can be defined in terms of normal stress and strain rate, i.e.,:
$\eta ext = \pi/\dot{\epsilon}$
$\eta ext$ = extensional viscosity (poise)
$\pi$ = normal stress (dynes/cm$^2$)
$\dot{\epsilon}$ = strain rate (sec$^{-1}$)

Due to the high shear stress developed during extrusion of a high molecular weight ethylene polymer having a narrow molecular weight distribution, melt fracture, particularly sharkskin melt fracture, occurs. Sharkskin melt fracture has been described in the literature for a number of polymers. "Sharkskin" is a term used to describe a particular type of surface irregularity which occurs during extrusion of some thermoplastic materials under certain conditions. It is characterized by a series of ridges perpendicular to the flow direction and is described by J. A. Brydson, *Flow Properties of Polymer Melts*, Van Nostrand-Reinhold Company (1970), pages 78-81.

In the present process, the onset of sharkskin melt fracture is determined by visual observation of the surface of an extrudate formed without take-off tension from a capillary die. Specifically, this procedure for determining sharkskin melt fracture is as follows: The extrudate is lighted from the side and examined under a 40× magnification microscope. The microscope shows the transition from a low-shear, glossy surface of the extrudate to a critical-shear, matted surface (the onset of sharkskin melt fracture) to a high-shear, deep ridge, sharkskin melt fracture. This method is generally reproducible to ±10 percent in shear stress.

The narrow molecular weight distribution ethylene polymers as described herein exhibit the characteristics of sharkskin melt fracture upon extruding using the prior art extrusion processes. These characteristics include a pattern of wave distortion perpendicular to the flow direction; occurrence at low extrusion rates (less than expected for elastic turbulance); not effected by the use of commonly employed metal die materials; and less melt fracture with increasing temperature.

There are several known methods for eliminating sharkskin melt fracture in polymers. These methods include increasing the resin temperature. However, in film formation this method is not commercially useful since increasing resin temperature generally causes lower rates of film formation, due to bubble instability or heat transfer limitations. Another method for eliminating sharkskin is described in U.S. Pat. No. 3,920,782. In this method sharkskin formed during extrusion of polymeric materials is controlled or eliminated by cooling an outer layer of the material so that it emerges from the die with a reduced temperature while maintaining the bulk of the melt at the optimum working temperature. However, this method is difficult to employ and control.

The invention of U.S. Pat. No. 3,920,782 is apparently based on the inventor's conclusions that the onset of sharkskin melt fracture under his operating conditions with his resins is a function, basically, of exceeding a critical linear velocity with his resins through his dies at his operating temperatures. In the process of the present invention, however, the onset of sharkskin melt fracture in the present applicants' resins under their operating conditions is a function, primarily, of exceeding a critical shear stress, and, to a lesser extent, a function of exceeding a critical linear velocity.

U.S. Pat. No. 3,382,535 discloses a means for designing dies which are to be used for the high speed extrusion coating of wire and cable with plastic materials such as polypropylene, high density and low density polyethylene, together with their copolymers, which are responsive, or sensitive, to the taper angles of the extrusion die. The dies of this patent are designed to avoid melt fracture in the form of roughness in the surface of the extruded plastic wire coating which is encountered under the peculiar stress conditions encountered in the high speed coating of wire and cable. The roughness of the surface of the wire coating is a very different type of melt fracture than sharkskin melt fracture, which is encountered under different stress conditions during the formation of film.

The invention of U.S. Pat. No. 3,382,535 resides in the designing of the taper angle of the die so as to provide a curvilinear die configuration (FIGS. 6 and 7 of the patent) which converges in the direction of flow of the resin. This procedure, however, of, in effect, decreasing the taper angle of the die, will result in an increase in the critical shear rate of the resin processed through the die. This reduces surface roughness as a function only of the angle of entry in and/or to the die. The present invention on the other hand relates to reducing melt fracture as a function of the exit geometry of the die. The process of U.S. Pat. No. 3,382,535 will be conducted under shear rates of greater than about 200 sec$^{-1}$.

This procedure of U.S. Pat. No. 3,382,535 is also intended to minimize the total pressure drop in the die, for a given final exit diameter for the die.

In the process of the present invention, however, where convergent dies are used, higher critical shear rates are obtained, and can be tolerated, without leading to sharkskin melt fracture. Where divergent dies are used in the process of the present invention the pressure drop in the die will decrease. The resins employed in the process of the present invention are also insensitive to divergent die taper angle relative to the onset of sharkskin melt fracture.

U.S. Pat. No. 3,879,507 discloses a means of reducing melt fracture during the extrusion of foamable compositions into film or sheet. This method involves increasing the length of the die land and/or slightly tapering the die gap, while retaining or decreasing the die gap, which is apparently to be relatively narrow, as compared to the prior art (see column 4, lines 2–6), and of the order of 0.025 inches or 25 mils (column 5, line 10). The process of the present invention, on the other hand, employs wide die gaps, of the order of greater than 50 mils, with divergent or convergent dies.

In the process of the present invention melt fracture, particularly sharkskin melt fracture, can be virtually eliminated by geometric changes in the die, i.e., by extruding the narrow molecular weight distribution ethylene polymer, at normal film extrusion temperatures, through a die having a die gap greater than about 50 mils and wherein at least a portion of one surface of the die lip and/or die land in contact with the molten polymer is at an angle of divergence or convergence relative to the axis of flow of the molten polymer through the die. The utility of the process of the present invention arises due to the fact that the stress field at the exit of the die determines the creation of sharkskin melt fracture. Thus, sharkskin melt fracture can be controlled or eliminated by the geometry at the exit of the die and is independent of die entrance or die land conditions. In this case, die design to eliminate or reduce melt fracture is based on a constant shear stress criteria. This is, the die is constructed such that the exit shear stress is kept near or below approximately 10 psi for a broad range of melt index (at least 0.5 to 20 MI) and temperature (from approximately 325° F. to 500° F.). On the other hand, for narrow dies, usually much less than 50 mil gap opening, a constant critical velocity criterion governs melt fracture. This is the mechanism described in Brydson (Ibid) p. 79 and requires a different design procedure in its range of utility (generally below 50 mil gaps).

Films suitable for packaging applications must possess a balance of key properties for broad end-use utility and wide commercial acceptance. These properties include film optical quality, for example, haze, gloss, and see-through characteristics. Mechanical strength properties such as puncture resistance, tensile strength, impact strength, stiffness, and tear resistance are important. Vapor transmission and gas permeability characteristics are important considerations in perishable goods packaging. Performance in film converting and packaging equipment is influenced by film properties such as coefficient of friction, blocking, heat sealability and flex resistance. Low density polyethylene has a wide range of utility such as in food packaging and non-food packaging applications. Bags commonly produced from low density polyethylene include shipping sacks, textile bags, laundry and dry cleaning bags and trash bags. Low density polyethylene film can be used as drum liners for a number of liquid and solid chemicals and as protective wrap inside wooden crates. Low density polyethylene film can be used in a variety of agricultural and horticultural applications such as protecting plants and crops, as mulching, for storing of fruits and vegetables. Additionally, low density polyethylene film can be used in building applications such as a moisture or moisture vapor barrier. Further, low density polyethylene film can be coated and printed for use in newspapers, books, etc.

Possessing a unique combination of the aforedescribed properties, high pressure low density polyethylene is the most important of the thermoplastic packaging films. It accounts for about 50% of the total usage of such films in packaging. Films made from the polymers of the present invention, preferably the ethylene hydrocarbon copolymers, offer an improved combination of end-use properties and are especially suited for many of the applications already served by high pressure low density polyethylene.

An improvement in any one of the properties of a film such as elimination or reduction of sharkskin melt fracture or an improvement in the extrusion characteristics of the resin or an improvement in the film extrusion process itself is of the utmost importance regarding the acceptance of the film as a substitute for high pressure low density polyethylene in many end use applications.

DRAWINGS

Figure 3I:
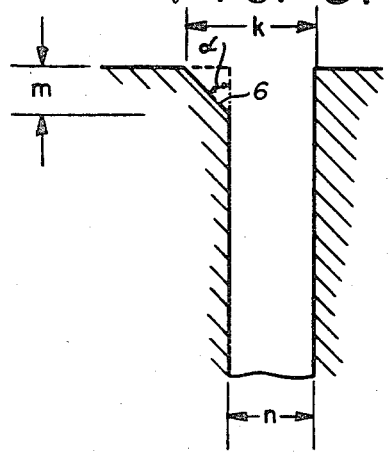
Figure 3I:
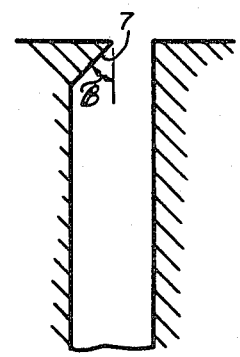
Figure 3I:
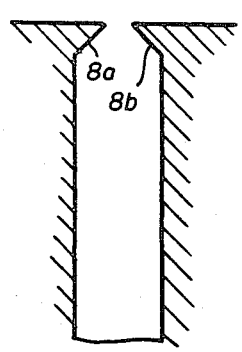
Figure 3I:
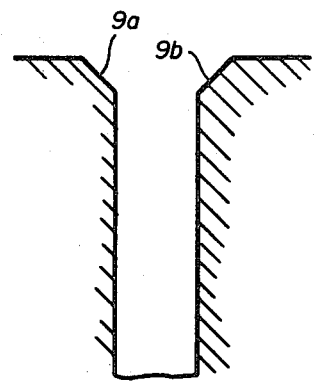

FIGS. 3i to 3iv shows various configurations of die gaps.

Figure 4:
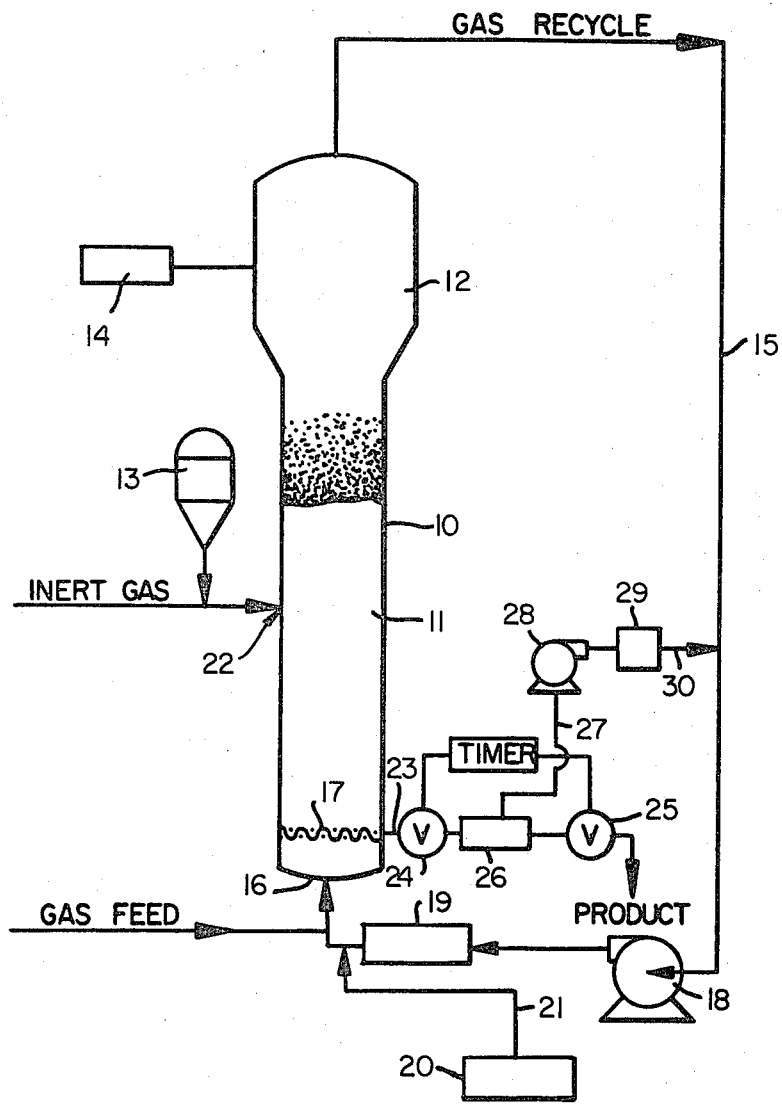

FIG. 4 shows a fluid bed reactor in which the ethylene polymers may be prepared.

SUMMARY OF THE INVENTION

It has now been found that melt fracture, particularly sharkskin melt fracture formed during extrusion of a molten narrow molecular weight distribution, linear, ethylene polymer, can be reduced by extruding said polymer through a die having a die gap greater than about 50 mils and wherein at least a portion of one surface of the die lip and/or die land in contact with the molten polymer is at an angle of divergence or convergence relative to the axis of flow of the molten polymer through the die.

DESCRIPTION OF THE PREFERRED EMBODIMENT

Dies

The molten ethylene polymer is extruded through a die, preferably an annular die, having a die gap greater than about 50 mils to less than about 200 mils. Extruding a molten ethylene polymer through a die having a die gap of greater than about 50 mils to less than about 120 mils, is described in U.S. Patent Application Ser. No. 892,324 filed Mar. 31, 1978, and refiled as Ser. No. 012,795 on Feb. 16, 1979, in the names of W. A. Fraser et al. and entitled A Process For Making Film From Low Density Ethylene Hydrocarbon Copolymer.

The die which may be used in the present invention may be a spiral annulus die, rod die, etc.

Figure 1:
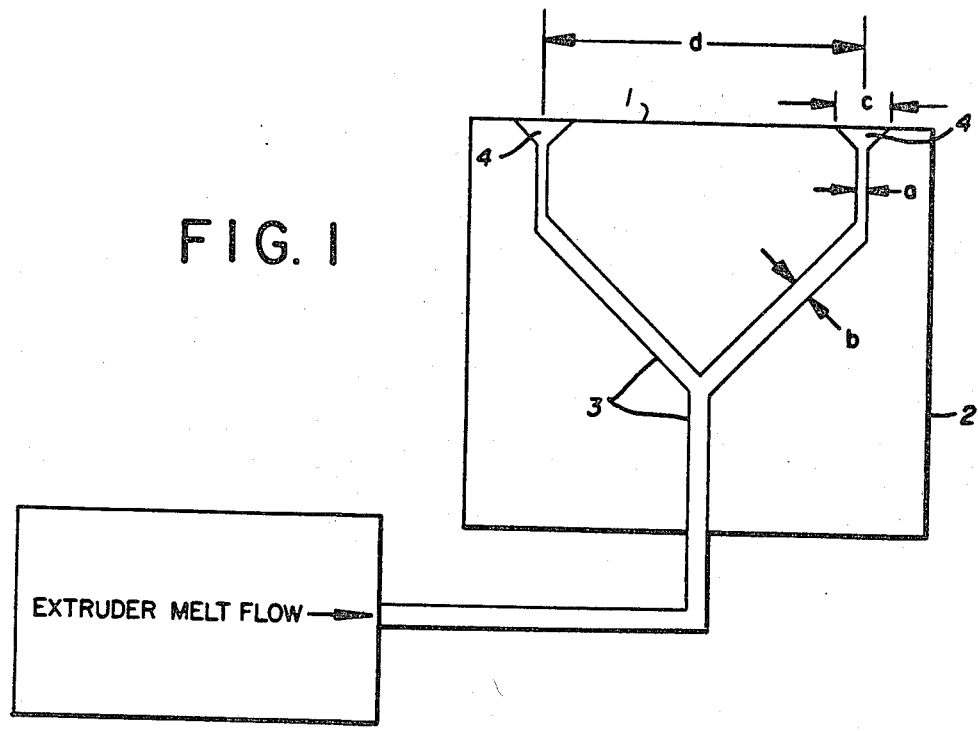
FIG. 1 shows a cross section of a spiral/spider annulus die.

FIG. 1 is a cross sectional view of a spiral/spider annulus die 1 through which the molten thermoplastic ethylene polymer is extruded. Die block 2 contains channels 3. As the molten thermoplastic ethylene polymer is extruded it spreads out as it passes into the die channels. In one embodiment dimension b is about 140 mils and dimension a is about 40 mils. The diameter of the die d is about 1 to 72 inches and preferably, from 6 to 32 inches. The die gap c is about 100 mils.

Figure 2:
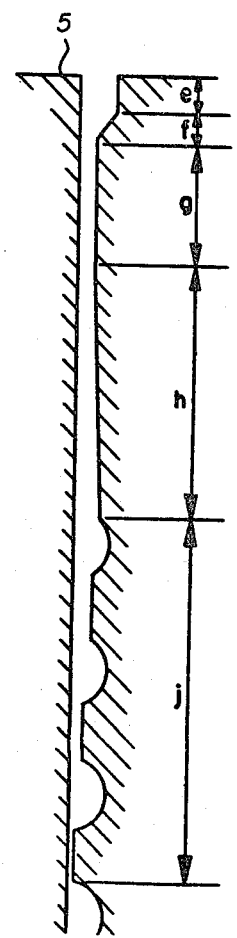
FIG. 2 shows a cross section of a spiral die.

FIG. 2 is a cross section of a spiral die 5 showing the spiral section j, land entry section h, die land g, and die lips e and f. In one embodiment dimensions e and f are about 0.5 inches, g is about 2 inches, h is about 4 inches and j is about 6 inches.

FIG. 3 shows four different designs of die lips. The die of FIG. 3i is one wherein the die lip 6 is divergent. Angle α is from about 1° to about 45°. Dimension k is from about 50 to about 200 mils; dimension m is from about 0.050 to 1.5 inches, while dimension n is from about 0.010 to 0.110 inches. The die of FIG. 3ii has one convergent die lip 7. Angle β is from about 5° to about 50°. The die of FIG. 3iii has both die lips 8a and 8b convergent. The die of FIG. 3iv has both die lips 9a and 9b divergent.

In the practice of this invention, the angle of divergence or convergence is in the area defined by the die land g, and/or die lip land f, as illustrated in FIG. 2. The polymer melt entering the die is distributed around the die in the spiral distribution (or other distributing system such as is found in a spider die, for example) and land entry area to form an annular flow to the die land.

The use of a spiral die as illustrated in FIG. 2 allows improvement in flow uniformity by using length g as a constriction. Thus, by combining a proper constriction and a die lip and/or die land geometry, uniform polymer melt, free of sharkskin melt fracture, and of good flow uniformity, can be obtained.

When at least a portion of one surface of the die lip and/or die land is at a convergent angle, the area after the die land may be divergent, preceeding the final converging section.

It is preferable to have an entry angle into the die land. This angle may be about 5° to about 20°.

FILM EXTRUSION

I. Blown Film Extrusion

The films formed as disclosed herein may be extruded by tubular blown film extrusion process. In this process a narrow molecular weight distribution polymer is melt extruded through an extruder. This extruder may have an extrusion screw therein with a length to diameter ratio of between 15:1 to 21:1, as described in U.S. Patent Application Ser. No. 940,005, filed Sept. 6, 1978, and refiled as Ser. No. 064,399 on Aug. 8, 1979, in the names of John C. Miller et al and entitled "A Process For Extruding Ethylene Polymers". This application describes that this extrusion screw contains a feed, transition and metering section. Optionally, the extrusion screw can contain a mixing section such as that described in U.S. Pat. Nos. 3,486,192; 3,730,492 and 3,756,574, whichare incorporated herein by reference. Preferably, the mixing section is placed at the screw tip.

The extruder which may be used herein may have a 18:1 to 32:1 length to internal diameter barrel ratio. The extrusion screw used in the present invention may have a length to diameter ratio of 15:1 to 32:1. When, for example, an extrusion screw of a length to diameter ratio of 18/1 is used in a 24/1 extruder, the remaining space in the extrusion barrel can be partially filled with various types of plugs, torpedoes, or static mixers to reduce residence time of the polymer melt.

The molten polymer is then extruded through a die, as will hereinafter be described.

The polymer is extruded at a temperature of about 325° to about 500° F. The polymer is extruded in an upward vertical direction in the form of a tube although it can be extruded downward or even sideways. After extrusion of the molten polymer through the annular die, the tubular film is expanded to the desired extent, cooled, or allowed to cool and flattened. The tubular film is flattened by passing the film through a collapsing frame and a set of nip rolls. These nip rolls are driven, thereby providing means for withdrawing the tubular film away from the annular die.

A positive pressure of gas, for example, air or nitrogen, is maintained inside the tubular bubble. As is known in the operation of conventional film processes, the pressure of the gas is controlled to give the desired degree of expansion to the tubular film. The degree of expansion, as measured by the ratio of the fully expanded tube circumference to the circumference of the die annulus, is in the range 1/1 to 6/1 and preferably, 1/1 to 4/1. The tubular extrudate is cooled by conventional techniques such as, by air cooling, water quench or mandrel.

The drawdown characteristics of the polymers disclosed herein are excellent. Drawdown, defined as the ratio of the die gap to the product of film gauge and blow up ratio, is kept greater than about 2 to less than about 250 and preferably greater than about 25 to less than about 150. Very thin gauge films can be produced at high drawdown from these polymers even when said polymer is highly contaminated with foreign particles and/or gel. Thin gauge films of about 0.5 to 3.0 mils can be processed to exhibit ultimate elongations MD greater than about 400% to about 700% and TD greater than about 500% to about 700%. Furthermore, these films are not perceived as "splitty". "Splittiness" is a qualitative term which describes the notched tear response of a film at high deformation rates. "Splittiness" reflects crack propagation rate. It is an end-use characteristic of certain types of film and is not well understood from a fundamentals perspective.

As the polymer exits the annulus die, the extrudate cools and its temperature falls below its melting point and it solidifies. The optical properties of the extrudate change as crystallization occurs and a frost line is formed. The position of this frost line above the annular die is a measure of the cooling rate of the film. This cooling rate has a very marked effect on the optical properties of the film produced herein.

The ethylene polymer can also be extruded in the shape of a rod or other solid cross section using the same die geometry for only the external surface. Additionally, the ethylene polymer can also be extruded into pipe through annular dies.

II. Slot Cast Film Extrusion

The films formed as disclosed herein may also be extruded by slot cast film extrusion. This film extrusion method is well known in the art and comprises extruding a sheet of molten polymer through a slot die and then quenching the extrudate using, for example, a chilled casting roll or water bath. The die will hereinafter be described. In the chill roll process, film may be extruded horizontally and laid on top of the chill roll or it may be extruded downward and drawn under the chill roll. Extrudate cooling rates in the slot cast process are very high. Chill roll or water batch quenching is so fast that as the extrudate cools below its melting point, crystallites nucleate very rapidly, supramolecular structures have little time to grow and spherulites are held to a very small size. The optical properties of slot cast film are vastly improved over those characterizing films using the slower cooling rate, tubular blown film extrusion process. Compound temperatures in the slot cast film extrusion process generally run much higher than those typifying the tubular blown film process. Melt strength is not a process limitation in this film extrusion method. Both shear viscosity and extensional viscosity are lowered. Film can generally be extruded at higher output rate than practiced in the blown film process. The higher temperatures reduce shear stresses in the die and raise the output threshold for melt fracture.

Film

The film produced by the method of the present invention has a thickness of greater than about 0.10 mils to about 20 mils, preferably greater than about 0.10 to 10 mils, most preferably greater than about 0.10 to 4.0 mils. The 0.10 to 4.0 mil film is characterized by the following properties: a puncture resistance value of greater than about 7.0 in-lbs/mil; an ultimate elongation of greater than about 400%; a thermal shrinkage of less than 3% after heating to 105°-110° C. and cooling to room temperature; tensile impact strength of greater than about 500 to about 2000 ft-lbs/in$^3$ and tensile strength greater than about 2000 to about 7000 psi.

Various conventional additives such as slip agents, antiblocking agents, and antioxidants can be incorporated in the film in accordance with conventional practice.

The Ethylene Polymers

The polymers which may be used in the process of the present invention are homopolymers of ethylene or copolymers of a major mol percent ($\geq 90\%$) of ethylene, and a minor mol percent ($\leq 10\%$) of one or more $C_3$ to $C_8$ alpha olefins. The $C_3$ to $C_8$ alpha olefins should not contain any branching on any of their carbon atoms which is closer than the fourth carbon atom. The preferred $C_3$ to $C_8$ alpha olefins are propylene, butene-1, pentene-1, hexene-1, 4-methylpentene-1 and octene-1.

The ethylene polymers have a melt flow ratio of about $\geq 22$ to $\leq 32$, and preferably of about $\geq 25$ to $\leq 30$. The melt flow ratio value is another means of indicating the molecular weight distribution of a polymer. The melt flow ratio (MFR) range of $\geq 22$ to $\leq 32$ thus corresponds to a Mw/Mn value range of about 2.7 to 4.1.

The homopolymers have a density of about $\geq 0.958$ to $\leq 0.972$ and preferably of about $\geq 0.961$ to $\leq 0.968$.

The copolymers have a density of about $\geq 0.91$ to $\leq 0.96$ and preferably $\geq 0.917$ to $\leq 0.955$, and most preferably, of about $\geq 0.917$ to $\leq 0.935$. The density of the copolymer, at a given melt index level for the copolymer, is primarily regulated by the amount of the $C_3$ to $C_8$ comonomer which is copolymerized with the ethylene. In the absence of the comonomer, the ethylene would homopolymerize with the catalyst of the present invention to provide homopolymers having a density of about $\geq 0.96$. Thus, the addition of progressively larger amounts of the comonomers to the copolymers results in a progressive lowering of the density of the copolymer. The amount of each of the various $C_3$ to $C_8$ comonomers needed to achieve the same result will vary from monomer to monomer, under the same reaction conditions.

Thus, to achieve the same results, in the copolymers, in terms of a given density, at a given melt index level, larger molar amounts of the different comonomers would be needed in the order of $C_3 > C_4 > C_5 > C_6 > C_7 > C_8$.

The ethylene polymers of the present invention have an unsaturated group content of $\leq 1$, and usually $\geq 0.1$ to $\leq 0.3$, C=C/1000 carbon atoms, and an n-hexane extractables content of less than about 3, and preferably less than about 2, weight percent.

When made in the fluid bed process described below polymers of the present invention are granular materials which have a settled bulk density of about 15 to 32 pounds per cubic foot and an average particle size of the order of about 0.005 to about 0.06 inches, and preferably of about $\geq 2.8$ to 3.1; and a standard melt index of $\geq 0.5$ particle size is important for the purposes of readily fluidizing the polymer particles in the fluid bed reactor, as described below.

For the purposes of making film in the process of the present invention the preferred polymers are the copolymers and particularly those copolymers having a density of about $\geq 0.917$ to $\leq 0.924$; a molecular weight distribution (Mw/Mn) of $\geq 2.7$ to $\leq 3.6$, and preferably of about $\geq 2.8$ to 3.1; and a standard melt index of $\geq 0.5$ to $\leq 5.0$ and preferably of about $\geq 1.0$ to $\leq 4.0$.

The films made in the process of the present invention have a thickness of $>0$ to $\leq 10$ mils and preferably of $>0$ to $\leq 5$ mils.

High Activity Catalyst

The compounds used to form a high activity catalyst which may be used in the fluid bed polymerization process described below to make polymers which may be used in the extrusion process of the present invention comprise at least one titanium compound, at least one magnesium compound, at least one electron donor compound, at least one activator compound and at least one inert carrier material, as defined below.

The titanium compound has the structure $$Ti(OR)_a X_b$$

wherein

R is a $C_1$ to $C_{14}$ aliphatic or aromatic hydrocarbon radical, or COR' where R' is a $C_1$ to $C_{14}$ aliphatic or aromatic hydrocarbon radical, X is Cl, Br, I or mixtures thereof, a is 0, 1 or 2, b is 1 to 4 inclusive and a+b=3 or 4.

The titanium compounds can be used individually or in combinations thereof, and would include $TiCl_3$, $TiCl_4$, $Ti(OCH_3)Cl_3$, $Ti(OC_6H_5)Cl_3$, $Ti(OCOCH_3)Cl_3$ and $Ti(OCOC_6H_5)Cl_3$.

The magnesium compound has the structure $$MgX_2$$

wherein X is Cl, Br or I. Such magnesium compounds can be used individually or in combinations thereof and would include $MgCl_2$, $MgBr_2$ and $MgI_2$. Anhydrous $MgCl_2$ is the particularly preferred magnesium compound.

About 0.5 to 56, and preferably about 1 to 10, mols of the magnesium compound are used per mol of the titanium compound in preparing the catalysts.

The titanium compound and the magnesium compound should be of a physical form and chemical nature such that they will have at least partial solubility in the electron donor compounds, as described below.

The electron donor compound is an organic compound which is liquid at 25° C. and in which the titanium compound and the magnesium compound are partially or completely soluble. The electron donor compounds are known, as such, or as Lewis bases.

The electron donor compounds would include such compounds as alkyl esters of aliphatic and aromatic carboxylic acids, aliphatic ethers, cyclic ethers and aliphatic ketones. Among these electron donor compounds the preferable ones are alkyl esters of $C_1$ to $C_4$ saturated aliphatic carboxylic acids; alkyl esters of $C_7$ to $C_8$ aromatic carboxylic acids; $C_2$ to $C_8$, and preferably $C_3$ to $C_4$, aliphatic ethers; $C_3$ to $C_4$ cyclic ethers, and preferably $C_4$ cyclic mono- or di-ether; $C_3$ to $C_6$, and preferably $C_3$ to $C_4$, aliphatic ketones; The most preferred of these electron donor compounds would include methyl formate, ethyl acetate, butyl acetate, ethyl ether, hexyl ether, tetrahydrofuran, dioxane, acetone and methyl isobutyl ketone.

The electron donor compounds can be used individually or in combinations thereof.

About 2 to 85, and preferably about 3 to 10 mols of the electron donor compound are used per mol of Ti.

The activator compound has the structure

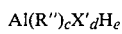

wherein $X'$ is Cl or $OR'''$, $R''$ and $R'''$ are the same or different and are $C_1$ to $C_{14}$ saturated hydrocarbon radicals, d is 0 to 1.5, e is 1 or 0 and $c+d+e=3$.

Such activator compounds can be used individually or in combinations thereof and would include $Al(C_2H_5)_3$, $Al(C_2H_5)_2Cl$, $Al(i-C_4H_9)_3$, $Al_2(C_2H_5)_3Cl_3$, $Al(i-C_4H_9)_2H$, $Al(C_6H_{13})_3$, $Al(C_2H_5)_2H$ and $Al(C_2H_5)_2(OC_2H_5)$.

About 10 to 400, and preferably about 15 to 60, mols of the activator compound are used per mol of the titanium compound in activating the catalyst employed in the present invention.

The carrier materials are solid, particulate materials which are inert to the other components of the catalyst composition, and to the other active components of the reaction system. These carrier materials would include inorganic materials such as oxides of silicon and aluminum and molecular sieves, and organic materials such as olefin polymers such as polyethylene. The carrier materials are used in the form of dry powders having an average particle size of about 10 to 250, and preferably of about 50 to 150 microns. These materials are also preferably porous and have a surface area of $\geq 3$, and preferably of $\geq 50$, square meters per gram. The carrier material should be dry, that is, free of absorbed water. This is normally done by heating or pre-drying the carrier material with a dry inert gas prior to use. The inorganic carrier may also be treated with about 1 to 8 percent by weight of one or more of the aluminum alkyl compounds described above to further activate the carrier.

Catalyst Preparation

The catalyst used to make the polymers employed in the extrusion process of the present invention is prepared by first preparing a precursor composition from the titanium compound, the magnesium compound, and the electron donor compound, as described below. The carrier material can then be impregnated with the precursor composition and then treated with the activator compound in one or more steps as described below. Alternatively the precursor composition can be treated with the carrier material and the activator compound in one or more steps as described below.

The precursor composition is formed by dissolving the titanium compound and the magnesium compound in the electron donor compound at a temperature of about 20° C. up to the boiling point of the electron donor compound. The titanium compound can be added to the electron donor compound before or after the addition of the magnesium compound, or concurrent therewith. The dissolution of the titanium compound and the magnesium compound can be facilitated by stirring, and in some instances by refluxing, these two compounds in the electron donor compound. After the titanium compound and the magnesium compound are dissolved, the precursor composition may be isolated by crystallization or by precipitation with a $C_5$ to $C_8$ aliphatic or aromatic hydrocarbon such as hexane, isopentane or benzene.

The crystallized or precipitated precursor composition may be isolated, in the form of fine, free flowing particles having an average particle size of about 10 to 100 microns and a settled bulk density of about 18 to 33 pounds per cubic foot.

When thus made as disclosed above the precursor composition has the formula

wherein
ED is the electron donor compound,
m is $\geq 0.5$ to $\leq 56$, and preferably $\geq 1.5$ to $\leq 5$,
n is 0.1 or 2
p is $\geq 2$ to $\leq 116$, and preferably $\geq 6$ to $\leq 14$,
q is $\geq 2$ to $\leq 85$, and preferably $\geq 4$ to $\leq 11$,
R is a $C_1$ to $C_{14}$ aliphatic or aromatic hydrocarbon radical, or $COR'$ wherein $R'$ is a $C_1$ to $C_{14}$ aliphatic or aromatic hydrocarbon radical and,
X is Cl, Br, I or mixtures thereof.

The precursor composition may then be impregnated, in a weight ratio of about 0.033 to 1, and preferably about 0.1 to 0.33, parts of the precursor composition into one part by weight of the carrier material.

The impregnation of the dried (activated) support with the precursor composition may be accomplished by dissolving the precursor composition in the electron donor compound, and by then admixing the support with the dissolved precursor composition so as to allow the precursor composition to impregnate the support. The solvent is then removed by drying at temperatures of $\leq 70°$ C.

The support may also be impregnated with the precursor composition by adding the support to a solution of the chemical raw materials used to form the precursor composition in the electron donor compound, without isolating the precursor composition from such solution. The excess electron donor compound is then removed by drying at temperatures of $\leq 70°$ C.

Alternatively, the precursor composition can be diluted with the carrier material. The dilution of the precursor composition can be accomplished before the precursor composition is partially or completely activated, as disclosed below, or concurrent with such activation. The dilution of the precursor composition is accomplished by mechanically mixing or blending about 0.033 to 1, and preferably about 0.1 to 0.33, parts of the precursor composition with one part by weight of the carrier material.

Activation of Precursor Composition

In order to be used to make the polymers employed in the extrusion process of the present invention the precursor composition must be fully or completely activated, that is, it must be treated with sufficient activator compound to transform the Ti atoms in the precursor composition to an active state.

It has been found that, in order to prepare a useful catalyst it is necessary to conduct the activation in such a way that, at least, the final activation stage must be conducted in the absence of solvent so as to avoid the need for drying the fully active catalyst to remove solvent therefrom. The activation procedure is hereafter described as to the impregnated precursor composition (A) and wherein the precursor composition is diluted with the carrier material (B).

A. Activation of Impregnated Precursor Composition

The activation is conducted in at least two stages. In the first stage the precursor composition, impregnated in the silica, is reacted with, and partially reduced by, enough activator compound so as to provide a partially activated precursor composition which has an activator compound/Ti molar ratio of about $>0$ to $<10:1$ and preferably of about 4 to about 8:1. This partial reduction reaction is preferably carried out in a hydrocarbon solvent slurry followed by drying of the resulting mixture, to remove the solvent, at temperatures between 20 to 80, and preferably of 50° to 70° C. In this partial activation procedure the activator compound may be used while absorbed on the carrier material used as the support for the precursor composition. The resulting product is a free-flowing solid particulate material which can be readily fed to the polymerization reactor. The partially activated and impregnated precursor composition, however, is at best, weakly active, as a polymerization catalyst in the polymerization process described below. In order to render the partially activated and impregnated precursor composition active for ethylene polymerization purposes, additional activator compound must also be added to the polymerization reactor to complete, in the reactor, the activation of the precursor composition. The additional activator compound and the partially activated impregnated precursor composition are preferably fed to the reactor through separate feed lines. The additional activator compound may be sprayed into the reactor in the form of a solution thereof in a hydrocarbon solvent such as isopentane, hexane, or mineral oil. This solution usually contains about 2 to 30 weight percent of the activator compound. The additional activator compound is added to the reactor in such amounts as to provide, in the reactor, with the amounts of activator compound and titanium compound fed with the partially activated and impregnated precursor composition, a total Al/Ti molar ratio of $\geq 10$ to 400 and preferable of about 15 to 60. The additional amounts of activator compound added to the reactor, react with, and complete the activation of, the titanium compound in the reactor.

B. Activation where Precursor is Diluted with Carrier Material

Two procedures have been developed to accomplish this result. In one procedure, the precursor composition is completely activated, outside the reactor, in the absence of solvent, by dry blending the precursor composition with the activator compound. In this dry blending procedure the activator compound is preferably used while absorbed on a carrier material. This procedure has a disadvantage, however, in that the resulting dry, fully activated catalyst is pyrophoric where it contains $>10$ weight percent of the activator compound.

In the second, and preferred, of such catalyst activation procedures, the precursor composition is partially activated outside the polymerization reactor with activator compound in a hydrocarbon slurry, the hydrocarbon solvent is removed by drying and the partially activated precursor composition is fed to the polymerization reactor where the activation is completed with additional activator compound.

Thus, in the dry blending catalyst making procedure the solid particulate precursor composition is added to and evenly blended with solid particles of porous carrier material wherein the activator compound is absorbed. The activator compound is absorbed on the carrier material, from a hydrocarbon solvent solution of the activator compound, so as to provide a loading of about 10 to 50 weight percent of activator compound on 90 to 50 weight percent of carrier material. The amounts of the precursor composition, activator compound and carrier material that are employed are such as to provide the desired Al/Ti molar ratios and to provide a final composition having a weight ratio of precursor composition to carrier material of less than about 0.50, and preferably of less than about 0.33. This amount of carrier material thus provides the necessary dilution therewith of the activated catalyst so as to provide the desired control of the polymerization activity of the catalyst in the reactor. Where the final compositions contain about $\geq 10$ weight percent of the activator compound, they will be pyrophoric. During the dry blending operation, which may be conducted at ambient (25° C.) or lower temperatures, the dry mixture is well agitated to avoid any heat build-up during the ensuing reduction reaction which is exothermic, initially. The resulting catalyst is thus completely reduced and activated and can be fed to, and used as such in, the polymerization reactor. It is a free-flowing particulate material.

In the second, and preferred catalyst activation procedure, the activation is conducted in at least two stages. In the first stage the solid particulate precursor composition, diluted with carrier material, is reacted with and partially reduced by enough activator compound so as to provide a partially activated precursor composition which has an activator compound/Ti molar ratio of about 1 to 10:1 and preferably of about 4 to 8:1. This partial reduction reaction is preferably carried out in a hydrocarbon solvent slurry followed by drying of the resulting mixture to remove the solvent, at temperatures between 20 to 80, and preferably of 50° to 70° C. In this partial activation procedure the activator compound may be used while absorbed on the carrier material used to dilute the activator compound. The resulting product is a free-flowing solid particulate material which can be readily fed to the polymerization reactor. The partially activated precursor composition, however, is, at best, weakly active as a polymerization catalyst in the polymerization process described below. In order to render the partially activated precursor composition active for ethylene polymerization purposes, additional activator compound must also be added to the polymerization reactor to complete, in the reactor, the activation of the precursor composition.

The additional activator compound and the partially activated precursor composition are preferably fed to the reactor through separate feed lines. The additional activator compound may be sprayed into the reactor in the form of a solution thereof in a hydrocarbon solvent such as isopentane, hexane, or mineral oil. This solution usually contains about 2 to 30 weight percent of the activator compound. The activator compound may also be added to the reactor in solid form, by being absorbed on a carrier material. The carrier material usually contains 10 to 50 weight percent of the activator for this purpose. The additional activator compound is added to the reactor in such amounts as to provide, in the reactor, with the amounts of activator compound and titanium compound fed with the partially activated precursor composition, a total Al/Ti molar ratio of about 10 to 400 and preferably of about 15 to 60. The additional amounts of activator compound added to the reactor, react with, and complete the activation of, the titanium compound in the reactor.

In a continuous gas phase process, such as the fluid bed process disclosed below, discrete portions of the partially or completely activated precursor composition or discrete portions of the partially activated precursor composition impregnated on the support are continuously fed to the reactor, with discrete portions of any additional activation of the partially activated precursor composition, during the continuing polymerization process in order to replace active catalyst sites that are expended during the course of the reaction.

The Polymerization Reaction

The polymerization reaction may be conducted by contacting a stream of the monomer(s), in a gas phase process, such as in the fluid bed process described below, and substantially in the absence of catalyst poisons such as moisture, oxygen, $CO$, $CO_2$, and acetylene with a catalytically effective amount of the completely activated precursor composition (the catalyst) which may be impregnated on a support at a temperature and at a pressure sufficient to initiate the polymerization reaction.

In order to achieve the desired density ranges in the copolymers it is necessary to copolymerize enough of the $\geq C_3$ comonomers with ethylene to achieve a level of $\geq 0$ to 10 mol percent of the $C_3$ to $C_8$ comonomer in the copolymer. The amount of comonomer needed to achieve this result will depend on the particular comonomer(s) employed.

There is provided below a listing of the amounts, in mols, of various comonomers that are copolymerized with ethylene in order to provide polymers having the desired density range at any given melt index. The listing also indicates the relative molar concentration, of such comonomers to ethylene, which are in the recycled gas stream of monomers under reaction equilibrium conditions in the reactor.

| Comonomer | mol % needed in copolymer | Gas Stream Comonomer/Ethylene molar ratio |
|---|---|---|
| propylene | >0 to 10 | >0 to 0.9 |
| butene-1 | >0 to 7.0 | >0 to 0.7 |
| pentene-1 | >0 to 6.0 | >0 to 0.45 |
| hexene-1 | >0 to 5.0 | >0 to 0.4 |
| octene-1 | >0 to 4.5 | >0 to 0.35 |

A fluidized bed reaction system which can be used in the practice of the process of the present invention is illustrated in FIG. 4. With reference thereto the reactor 10 consists of a reaction zone 11 and a velocity reduction zone 12.

The reaction zone 11 comprises a bed of growing polymer particles, formed polymer particles and a minor amount of catalyst particles fluidized by the continuous flow of polymerizable and modifying gaseous components in the form of make-up feed and recycle gas through the reaction zone. To maintain a viable fluidized bed, the mass gas flow rate through the bed must be above the minimum flow required for fluidization, and preferably from about 1.5 to about 10 times $G_{mf}$ and more preferably from about 3 to about 6 times $G_{mf}$. $G_{mf}$ is used in the accepted form as the abbreviation for the minimum mass gas flow required to achieve fluidization, C. Y. Wen and Y. H. Yu, "Mechanics of Fluidization", Chemical Engineering Progress Symposium Series, Vol. 62, p. 100–111 (1966).

It is essential that the bed always contains particles to prevent the formation of localized "hot spots" and to entrap and distribute the particulate catalyst throughout the reaction zone. On start up, the reaction zone is usually charged with a base of particulate polymer particles before gas flow is initiated. Such particles may be identical in nature to the polymer to be formed or different therefrom. When different, they are withdrawn with the desired formed polymer particles as the first product. Eventually, a fluidized bed of the desired polymer particles supplants the start-up bed.

The partially or completely activated precursor compound (the catalyst) used in the fluidized bed is preferably stored for service in a reservoir 13 under a blanket of a gas which is inert to the stored material, such as nitrogen and argon.

Fluidization is achieved by a high rate of gas recycle to and through the bed, typically in the order of about 50 times the rate of feed of make-up gas. The fluidized bed has the general appearance of a dense mass of viable particles in possible free-vortex flow as created by the percolation of gas through the bed. The pressure drop through the bed is equal to or slightly greater than the mass of the bed divided by the cross-sectional area. It is thus dependent on the geometry of the reactor.

Make-up gas is fed to the bed at a rate equal to the rate at which particulate polymer product is withdrawn. The composition of the make-up gas is determined by a gas analyzer 14 positioned above the bed. The gas analyzer determines the composition of the gas being recycled and the composition of the make-up gas is adjusted accordingly to maintain an essentially steady state gaseous composition within the reaction zone.

To insure complete fluidization, the recycle gas and, where desired, part of the make-up gas are returned over gas recycle line 15 to the reactor at point 16 below the bed. There exists a gas distribution plate 17 above the point of return to aid fluidizing the bed.

The portion of the gas stream which does not react in the bed constitutes the recycle gas which is removed from the polymerization zone, preferably by passing it into a velocity reduction zone 12 above the bed where entrained particles are given an opportunity to drop back into the bed.

The recycle gas is then compressed in a compressor 18 and then passed through a heat exchanger 19 wherein it is stripped of heat of reaction before it is returned to the bed. The temperature of the bed is controlled at an essentially constant temperature under steady state conditions by constantly removing heat of reaction. No noticeable temperature gradient appears to exist within the upper portion of the bed. A temperature gradient will exist in the bottom of the bed in a layer of about 6 to 12 inches, between the temperature of the inlet gas and the temperature of the remainder of the bed. The recycle is then returned to the reactor at its base 16 and to the fluidized bed through distribution plate 17. The compressor 18 can also be placed downstream of the heat exchanger 19.

The distribution plate 17 plays an important role in the operation of the reactor. The fluidized bed contains growing and formed particulate polymer particles as well as catalyst particles. As the polymer particles are hot and possibly active, they must be prevented from settling, for if a quiescent mass is allowed to exist, any active catalyst contained therein may continue to react and cause fusion. Diffusing recycle gas through the bed at a rate sufficient to maintain fluidization at the base of the bed is, therefore, important. The distribution plate 17 serves this purpose and may be a screen, slotted plate, perforated plate, a plate of the bubble cap type, and the like. The elements of the plate may all be stationary, or the plate may be of the mobile type disclosed in U.S. Pat. No. 3,298,792. Whatever its design, it must diffuse the recycle gas through the particles at the base of the bed to keep them in a fluidized condition, and also serve to support a quiescent bed of resin particles when the reactor is not in operation. The mobile elements in the plate may be used to dislodge any polymer particles entrapped in or on the plate.

Hydrogen may be used as a chain transfer agent in the polymerization reaction of the present invention. The ratio of hydrogen/ethylene employed will vary between about 0 to about 2.0 moles of hydrogen per mole of the monomer in the gas stream.

Any gas inert to the catalyst and reactants can also be present in the gas stream. The activator compound is preferably added to the reaction system downstream from heat exchanger 19. Thus, the activator compound may be fed into the gas recycle system from dispenser 20 thru line 21.

Compounds of the structure $Zn(R_a)(R_b)$, wherein $R_a$ and $R_b$ are the same or different $C_1$ to $C_{14}$ aliphatic or aromatic hydrocarbon radicals, may be used in conjunction with hydrogen, with the catalysts described herein as molecular weight control or chain transfer agents, that is, to increase the melt index values of the polymers that are produced. About 0 to 100, and preferably about 20 to 30, mols of the Zn compound (as Zn) would be used in the gas stream in the reactor per mol of titanium compound (as Ti) in the reactor. The zinc compound would be introduced into the reactor preferably in the form of a dilute solution (2 to 30 weight percent) in hydrocarbon solvent or absorbed on a solid diluent material, such as silica, of the types described above, in amounts of about 10 to 50 weight percent. These compositions tend to be pyrophoric. The zinc compound may be added alone, or with any additional portions of the activator compound that are to be added to the reactor from a feed, not shown, which could be positioned adjacent dispenser 20.

It is essential to operate the fluid bed reactor at a temperature below the sintering temperature of the polymer particles to insure that sintering will not occur. For the production of the ethylene polymers in the polymerization process described herein an operating temperature of about 30° to 115° C. is preferred, and a temperature of about 75° to 95° C. is most preferred.

Temperatures of about 75° to 95° C. are used to prepare polymers having a density of about 0.91 to 0.92, and temperatures of about 80° to 100° C. are used to prepare polymers having a density of about >0.92 to 0.94, and temperatures of about 90° to 115° C. are used to prepare polymers having a density of >0.94 to 0.97.

The fluid bed reactor is operated at pressures of up to about 1000 psi, and is preferably operated at a pressure of from about 150 to 350 psi, with operation at the higher pressures in such ranges favoring heat transfer since an increase in pressure increases the unit volume heat capacity of the gas.

The partially or completely activated precursor composition is injected into the bed at a rate equal to its consumption at a point 22 which is above the distribution plate 17. Preferably, the catalyst is injected at a point in the bed where good mixing of polymer particles occurs. Injecting the catalyst at a point above the distribution plate is an important feature of this invention. Since the catalysts described herein are highly active, injection of the fully activated catalyst into the area below the distribution plate may cause polymerization to begin there and eventually cause plugging of the distribution plate. Injection into the viable bed, instead, aids in distributing the catalyst throughout the bed and tends to preclude the formation of localized spots of high catalyst concentration which may result in the formation of "hot spots". Injection of the catalyst into the reactor above the bed may result in excessive catalyst carryover into the recycle line where polymerization may begin and plugging of the line and heat exchanger may eventually occur.

A gas which is inert to the catalyst such as nitrogen or argon is used to carry the partially or completely reduced precursor composition, and any additional activator compound or non-gaseous chain transfer agent that is needed, into the bed.

The production rate of the bed is controlled by the rate of catalyst injection. The production rate may be increased by simply increasing the rate of catalyst injection and decreased by reducing the rate of catalyst injection.

Since any change in the rate of catalyst injection will change the rate of generation of the heat of reaction, the temperature of the recycle gas entering the reactor is adjusted upwards or downwards to accommodate the change in rate of heat generation. This insures the maintenance of an essentially constant temperature in the bed. Complete instrumentation of both the fluidized bed and the recycle gas cooling system, is, of course, necessary to detect any temperature change in the bed so as to enable the operator to make a suitable adjustment in the temperature of the recycle gas.

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a measurement of the temperature rise of the gas across the reactor (the difference between inlet gas temperature and exit gas temperature) is determinative of the rate of particulate polymer formation at a constant gas velocity.

The particulate polymer product is preferably continuously withdrawn at a point 23 at or close to the distribution plate 17 and in suspension with a portion of the gas stream which is vented as the particles settle to minimize further polymerization and sintering when the particles reach their ultimate collection zone. The suspending gas may also be used to drive the product of one reactor to another reactor.

The particulate polymer product is conveniently and preferably withdrawn through the sequential operation of a pair of timed valves 24 and 25 defining a segregation zone 26. While valve 25 is closed, valve 24 is opened to emit a plug of gas and product to the zone 26 between it and valve 24 which is then closed. Valve 25 is then opened to deliver the product to an external recovery zone. Valve 25 is then closed to await the next product recovery operation. The vented gas containing unreacted monomers may be recovered from zone 26 through line 27 and recompressed in compressor 28 and returned directly, or through a purifier 29, over line 30 to gas recycle line 15 at a point upstream of the recycle compressor 18.

Finally, the fluidized bed reactor is equipped with an adequate venting system to allow venting the bed during start up and shut down. The reactor does not require the use of stirring means and/or wall scraping means. The recycle gas line 15 and the elements therein (compressor 18, heat exchanger 19) should be smooth surfaced, and devoid of unnecessary obstructions, so as not to impede the flow of recycle gas.

The catalyst system and polymerization process described herein appears to yield a fluid bed polymer product having an average particle size between about 0.005 to about 0.06 inches and preferably about 0.02 to about 0.04 inches.

The feed stream of gaseous monomer, with or without inert gaseous diluent, is fed into the reactor at a space time yield of about 2 to 10 pounds/hour/cubic foot of bed volume.

The properties of the polymers produced in the Examples were determined by the following test methods:

Density: For materials having a density <0.940, ASTM-1505 procedure is used and plaque is conditioned for one hour at 100° C. to approach equilibrium crystallinity. For materials having a density of ≧0.940, a modified procedure is used wherein the test plaque is conditioned for one hour at 120° C. to approach equilibrium crystallinity and is then quickly cooled to room temperature. All density values are reported as grams/cm³. All density measurements are made in a density gradient column.

Melt Index (MI): ASTM D-1238—Condition E—Measured at 190° C.—reported as grams per 10 minutes.

Flow Rate (HLMI): ASTM D-1238—Condition F—Measured at 10 times the weight used in the melt index test above.

Melt Flow Ratio (MFR)=Flow Rate/Melt Index productivity: a sample of the resin product is ashed, and the weight % of ash is determined; since the ash is essentially composed of the catalyst, the productivity is thus the pounds of polymer produced per pound of total catalyst consumed. The amount of Ti, Mg and halide in the ash are determined by elemental analysis.

n-hexane extractables: (FDA test used for polyethylene film intended for food contact applications). A 200 square inch sample of 1.5 mil gauge film is cut into strips measuring 1"×6" and weighed to the nearest 0.1 mg. The strips are placed in a vessel and extracted with 300 ml of n-hexane at 50°±1° C. for 2 hours. The extract is then decanted into tared culture dishes. After drying the extract in a vacuum desiccator, the culture dish is weighed to the nearest 0.1 mg. The extractables, normalized with respect to the original sample weight, is then reported as the weight fraction of n-hexane extractables.

Average Particle Size: This is calculated from sieve analysis data measured according to ASTM-D-1921 Method A using a 500 g sample. Calculations are based on weight fractions retained on the screens.

Unsaturation: Infrared Spectrophotometer (Perkin Elmer Model 21). Pressings made from the resin which are 25 mils in thickness are used as test specimens. Absorbance is measured at $10.35\mu$ for transvinylidene unsaturation, $11.0\mu$ for terminal vinyl unsaturation, and $11.25\mu$ for pendant vinylidene unsaturation. The absorbance per mil of thickness of the pressing is directly proportional to the product of unsaturation concentration and absorbtivity. Absorbtivities are taken from the literature values of R. J. de Kock, et al, J. Polymer Science, Part B, 2, 339, (1964).

bulk density: The resin is poured via $\frac{3}{8}''$ diameter funnel into a 100 ml graduated cylinder to 100 ml line without shaking the cylinder, and weighed by difference. The values are reported in lbs/ft³.

Molecular Weight Distribution (Mw/Mn): Gel Permeation Chromatography For resins with density <0.94; Styrogel Packing: (Pore Size Sequence is $10^7$, $10^5$, $10^4$, $10^3$, 60 A°) Solvent is Perchloroethylene at 117° C. For resins with density ≧0.94: Styrogel Packing: (Pore Size Sequence is $10^7$, $10^6$, $10^5$, $10^4$, 60A°) Solvent is ortho dichloro benzene at 135° C. Detection for all resins: Infra red at $3.45\mu$.

The following Examples are designed to illustrate the process of the present invention and are not intended as a limitation upon the scope thereof.

I. Preparation of Impregnated Precursor

In a 12 l flask equipped with a mechanical stirrer are placed 41.8 g (0.439 mol) anhydrous $MgCl_2$ and 2.5 l tetrahydrofuran (THF). To this mixture, 27.7 g (0.184 mol) $TiCl_4$ is added dropwise over $\frac{1}{2}$ hour. It may be necessary to heat the mixture to 60° C. for about $\frac{1}{2}$ in order to completely dissolve the material.

500 g of porous silica is added and the mixture stirred for $\frac{1}{4}$ hour. The mixture is dried with a $N_2$ purge at 60° C. for about 3–5 hours to provide a dry free flowing powder having the particle size of the silica. The absorbed precursor composition has the formula

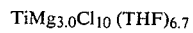

$TiMg_{3.0}Cl_{10}(THF)_{6.7}$

Ib. Preparation of Impregnated Precursor from Preformed Precursor Composition

In a 12 liter flask equipped with a mechanical stirrer, 146 g of precursor composition is dissolved in 2.5 liters dry THF. The solution may be heated to 60° C. in order to facilitate dissolution. 500 g of porous silica is added and the mixture is stirred for $\frac{1}{4}$ hour. The mixture is dried with a $N_2$ purge at ≦60° C. for about 3–5 hours to provide a dry free flowing powder having the particle size of the silica.

The precursor composition employed in this Procedure Ib. is formed as in Procedure Ia. except that it is recovered from the solution thereof in THF by crystallization or precipitation.

The precursor composition may be analyzed at this point for Mg and Ti content since some of the Mg and/or Ti compound may have been lost during the isolation of the precursor composition. The empirical formulas used herein in reporting the precursor compositions are derived by assuming that the Mg and Ti still exist in the form of the compounds in which they were first added to the electron donor compound. The amount of electron donor is determined by chromatography.

II. Activation Procedure

The desired weights of impregnated precursor composition and activator compound are added to a mixing tank with sufficient amounts of anhydrous aliphatic hydrocarbon diluent such as isopentane to provide a slurry system.

The activator compound and precursor compound are used in such amounts as to provide a partially activated precursor composition which as an Al/Ti ratio of >0 to $\leq 10:1$ and preferably of 4 to 8:1.

The contents of the slurry system are then thoroughly mixed at room temperature and at atmospheric pressure for about $\frac{1}{4}$ to $\frac{1}{2}$ hour. The resulting slurry is then dried under a purge of dry inert gas such as nitrogen or argon, at atmospheric pressure and at a temperature of $65°\pm 10°$ C. to remove the hydrocarbon diluluent. This process usually requires about 3 to 5 hours. The resulting catalyst is in the form of a partially activated precursor composition which is impregnated within the pores of the silica. The material is a free flowing particulate material having the size and shape of the silica. It is not pyrophoric unless the aluminum alkyl content exceeds a loading of 10 weight percent. It is stored under a dry inert gas such as nitrogen or argon prior to future use. It is now ready for use by being injected into, and fully activated within, the polymerization reactor.

When additional activator compound is fed to the polymerization reactor for the purpose of completing the activation of the precursor composition, it is fed into the reactor as a dilute solution in a hydrocarbon solvent such as isopentane. These dilute solutions contain about 5 to 30% by volume of the activator compound.

The activator compound is added to the polymerization reactor so as to maintain the Al/Ti ratio in the reactor at a level of about $\geq 10$ to 400:1 and preferably of 15 to 60:1.

EXAMPLE 1

Preparation of Copolymer

Ethylene was copolymerized with propylene or butene-1 (propylene in Runs 1 and 2 and butene-1 in Runs 3 to 14) in each of this series with catalyst formed as described above and as activated by Activation Procedure A to produce polymers having a density of $\leq 0.940$. In each case, the partially activated precursor composition had an Al/Ti mol ratio of 4.4 to 5.8. The completion of the activation of the precursor composition in the polymerization reactor was accomplished with triethyl aluminum (as a 5 weight % solution in isopentane in Runs 1 to 3 and 4 to 14, and adsorbed on silica, 50/50 weight %, in Runs 4 and 5 so as to provide the completely activated catalyst in the reactor with an Al/Ti mol ratio of about 29 to 140.

Each of the polymerization reactions was continuously conducted for >1 hour after equilibrium was reached and under a pressure of about 300 psia and a gas velocity of about 5 to 6 times $G_{mf}$ in a fluid bed reactor system at a space time yield of about 3 to 6 lbs/hr/ft$^3$ of bed space. The reaction system was as described in the drawing above. It has a lower section 10 feet high and $13\frac{1}{2}$ inches in (inner) diameter, and an upper section which was 16 feet high and $23\frac{1}{2}$ inches in (inner) diameter.

In several of the Runs zinc diethyl was added during the reaction (as a 2.6 weight % solution in isopentane) to maintain a constant Zn/Ti mol ratio. Where the zinc diethyl was used, the triethyl aluminum was also added as a 2.6 weight percent in isopentane.

Table A below lists, with respect to Runs 1 to 14, various operating conditions employed in such examples i.e., the weight percent of precursor composition in the blend of silica and precursor composition; Al/Ti ratio in the partially activated precursor compostion; Al/Ti ratio maintained in the reactor; polymerization temperature; percent by volume of ethylene in reactor; H$_2$/ethylene mol ratio; comonomer (C$_x$)/C$_2$ mol ratio in reactor; catalyst productivity and Zn/Ti mol ratio. Table B below lists properties of the granular virgin resins made in runs 1 to 14, i.e., density; melt index (M.I.); melt flow ratio (MFR); weight percent ash; Ti content (ppm), bulk density and average particle size.

TABLE A

Reaction Conditions For Runs 1 to 14

| Run No | Weight % precursor | Al/Ti ratio in part. act precursor | Al/Ti ratio in reactor | Temp °C. | Vol % C$_2$ | H$_2$/C$_2$ mol ratio | C$_x$/C$_2$ mol ratio |
|---|---|---|---|---|---|---|---|
| 1 | 8.3 | 5.8 | 40.5 | 90 | 41.7 | 0.492 | 0.486 |
| 2 | 8.3 | 5.8 | 50.8 | 90 | 39.7 | 0.566 | 0.534 |
| 3 | 20.1 | 4.50 | 88.3 | 85 | 56.3 | 0.148 | 0.450 |
| 4 | 19.8 | 4.40 | 26.7 | 85 | 50.2 | 0.350 | 0.350 |
| 5 | 19.8 | 4.40 | 26.7 | 80 | 54.1 | 0.157 | 0.407 |
| 6 | 6.9 | 5.08 | 42.0 | 85 | 49.2 | 0.209 | 0.480 |
| 7 | 6.9 | 5.08 | 33.6 | 85 | 46.5 | 0.208 | 0.482 |
| 8 | 6.9 | 5.08 | 28.8 | 85 | 42.1 | 0.206 | 0.515 |
| 10 | 8.3 | 5.8 | 124.6 | 90 | 45.1 | 0.456 | 0.390 |
| 11 | 8.3 | 5.8 | 80.8 | 90 | 42.7 | 0.365 | 0.396 |
| 12 | 8.3 | 5.8 | 52.0 | 90 | 48.4 | 0.350 | 0.397 |
| 13 | 8.3 | 5.8 | 140.1 | 90 | 42.6 | 0.518 | 0.393 |
| 14 | 8.3 | 5.8 | 63.5 | 90 | 40.8 | 0.556 | 0.391 |

TABLE B

Properties of Polymers Made in Runs 1 to 14

| Run No | Density | M.I. | MFR | bulk density | average particle size, inches |
|---|---|---|---|---|---|
| 1 | 0.927 | 22.0 | 24.4 | 16.8 | 0.0230 |
| 2 | 0.929 | 24.0 | 23.4 | 17.5 | 0.0230 |
| 3 | 0.925 | 0.61 | 27.1 | 16.8 | 0.0300 |
| 4 | 0.931 | 12.0 | 26.7 | 16.8 | 0.0275 |
| 5 | 0.923 | 1.67 | 28.2 | 15.6 | 0.0404 |
| 6 | 0.919 | 3.41 | 25.9 | 16.8 | 0.0550 |
| 7 | 0.925 | 2.90 | 24.5 | 17.5 | 0.0590 |
| 8 | 0.919 | 3.10 | 24.6 | 16.2 | 0.0570 |
| 10 | 0.929 | 16.0 | 24.1 | 17.3 | 0.0230 |
| 11 | 0.929 | 15.3 | 24.0 | 16.6 | 0.0234 |
| 12 | 0.928 | 11.5 | 24.1 | 16.7 | 0.0248 |
| 13 | 0.929 | 20.7 | 24.3 | 17.3 | 0.0258 |
| 14 | 0.929 | 29.2 | 26.1 | 16.8 | 0.0206 |

EXAMPLE 2

An ethylene-butene copolymer prepared as in Example 1 and having a density of 0.924 and a melt index of 2.0 was formed into a film of 1.5 mil gauge by blown film extrusion using a $2\frac{1}{2}$ inch diameter 18:1 L/D extrusion screw in a 24/1 extruder. The extrusion screw had a feed section of 12.5 inches, transition section of 7.5 inches, a metering section of 20 inches, and a mixing section of 5 inches. The mixing section was a fluted mixing section with the following characteristics: a diameter of 2.5 inches; 3.0 inch channels; channel radius of 0.541 inches; mixing barrier land width of 0.25 inches; cleaning barrier land width of 0.20 inches; and a mixing barrier length of 4.5 inches. The void in the barrel was filled by a plug 2.496 inches in diameter, 11.0 inches long which contained a static mixer 9.0 inches long and 1.0 inch in diameter. Also, a 20/60/20 mesh screen pack and a three inch diameter die were used. The die had a gap of 40 mils. The sides of the die were parallel with the flow axis of the polymer melt. The melt temperature of the copolymer was about 400° F. Nip roll height was approximately 15 ft. Cooling was accomplished with a Venturi type air ring. All films were prepared at a 2:1 blow-up ratio (ratio of bubble circumference to die circumference). The rate of production of the film was 7.27 lbs/hour/inch of die. Sharkskin melt fracture was measured using a 40× magnification microscope. In this procedure, the extrudate is lighted from the side. The microscope shows the transition from a low-shear glossy surface of the extrudate to a critical-shear, matted surface (the onset of sharkskin melt fracture) to highs-shear,deep-ridge,-sharkskin melt fraction. A high level of sharkskin melt fracture was observed during production of the film.

EXAMPLE 3

The procedure of Example 2 was exactly repeated except that melt temperature was about 380° F. and the rate of production of the film was 4.14 pounds/hour/inch of die. A high level of sharkskin melt fracture was observed during production of the film.

EXAMPLE 4

The procedure of Example 2 was exactly repeated except that the die had a gap of 80 mils, melt temperature was about 390° F. and the rate of production of the film was 7.38 pounds/hour/inch of die. A low level of sharkskin melt fracture was observed during production of the film.

EXAMPLE 5

The procedure of Example 2 was exactly repeated except that a die had the configuration as in FIG. 3i was used with angle $\alpha = 4.57°$, and dimensions k=80 mils, m=50 mils, and n=40 mils. Melt temperature was about 398° F. and the rate of production of the film was 7.22 pounds/hour/inch of die. No melt fracture was observed during production of the film.

EXAMPLE 6

The procedure of Example 2 was exactly repeated except that the die described in Example 5 was used, melt temperature was about 410° F. and the rate of production of the film was 8.38 pounds/hour/inch of die. A low level of sharkskin melt fracture was observed during production of the film.

The results of Examples 2 to 6 are summarized in Table I.

TABLE I

| Example | Die gap (mils) | Die design | Rate (lb/hr/in of die) | Die temp (°F.) | Melt Fracture |
|---|---|---|---|---|---|
| 2 | 40 | Parallel surfaces | 7.27 | 400 | High level |
| 3 | 40 | Parallel surfaces | 4.14 | 380 | High level |
| 4 | 80 | Parallel surfaces | 7.38 | 390 | Low level |
| 5 | 80 | One side divergent | 7.22 | 398 | None |
| 6 | 80 | One side divergent | 8.38 | 410 | Low level |

The data of Table I show that the final die gap opening is the primary geometric factor controlling sharkskin melt fracture. Examples 2 and 3 in which the sides of the die are parallel and which have a die gap of 40 mils produce film with a high level of melt fracture. This high level of melt fracture occurs in Example 3 with the much lower rate of formation of film. A comparison of a die having one surface of the die lip at a divergent angle from the flow axis of the melt through the die (a die of the present invention, Example 5) with a die having parallel sides (Example 4), with the die gap of each die=80 mils, shows that no melt fracture occurs with the die of the present invention. Even at a higher production rate and higher die temperature, the die of the present invention (Example 6) produces a low level of melt fracture.

EXAMPLE 7

An ethylene-butene copolymer prepared as in Example 1 and having a density of 0.924 and a melt index of 2.0 was formed into a film of 1.5 mil gauge by blown film extrusion using a 2½ inch diameter screw extruder as described in Example 2.

The die with the configuration as shown in FIG. 3i was used. Angle $\alpha = 5.7°$, the die gap (dimension k)=100 mils, m=500 mils, and n=60 mils. The melt temperature of the copolymer was about 400° F. Nip roll height was approximately 15 ft. Cooling was accomplished with a Venturi type air ring. Blow up ratio was 2:1. The rate of production of the film was 7.0 lbs/hour/inch of die. Shark-skin melt fracture was determined as in Example 2. No melt fracture was observed during production of the film.

EXAMPLE 8

The procedure of Example 7 was exactly repeated except that the angle $\alpha$ of the die was 20° and m=0.110 inches No melt fracture was observed during production of the film.

EXAMPLE 9

The procedure of Example 7 was exactly repeated except that the angle $\alpha$ of the die was 40° and m=0.050 inches. No melt fracture was observed during production of the film.

EXAMPLE 10

The procedure of Example 7 was exactly repeated except that the angle $\alpha$ of the die was 0°, and m=0 inches, i.e., the sides of the die were parallel. A high level of melt fracture was observed during production of the film.

These Examples 7 to 10 demonstrate that when using the die of the present invention (Example 7 to 9), no melt fracture was observed even when the angle of divergence was as high as 40° (Example 9). When the die sides were parallel, a high level of melt fracture was observed for a die gap equivalent to the upstream land separation before the divergent section.

EXAMPLE 11

An ethylene-butene copolymer prepared as in Example 1 and having a density of 0.919 and a melt index of 2.0 was formed into a rod using a capillary rheometer.

The rod die was 2.40 cm long with parallel sides and a constant internal diameter of 0.123 cm. The melt temperature of the copolymer was 180° C. The polymer was extruded at a volumetric flow rate of 0.011 cm$^3$/sec.

The apparent shear rate $\dot{\gamma}_a$ was determined according to the following equation:

apparent shear rate $\gamma_a = (4Q/nr^3)$, sec$^{-1}$

Q = volumetric flow rate, cm$^3$/sec
r = internal radius of the die, cm.

The apparent shear rate at the onset of melt fracture was 60 sec$^{-1}$ (with r in the equation = radius of the die at the exit). Also, the channel shear rate was 60 sec.$^{-1}$ (with r in the equation = radius of the channel.)

EXAMPLE 12

The procedure of Example 11 was exactly repeated except that the rod die was 2.54 cm. long with the entry section 0.337 cm in diameter and the die gap of 0.126 cm. The die lip was convergent with the same cross section as shown in FIG. 3iii with the angle of convergence = 10°.

The melt temperature of the copolymer was 180° C. The polymer was extruded at a volumetric flow rate of 0.0244 cm$^3$/sec. The apparent shear rate was determined as in Example II. The apparent shear rate at the onset of melt fracture was 125 sec$^{-1}$ (with r in the equation = radius of the die at the exit). Also, the channel shear rate was 7 sec$^{-1}$ (with r in the equation = radius of the channel).

The data of Examples 11 and 12 show that at approximately the same exit diameter, using the die of the present invention (Example 12) about twice the flow rate of polymer through the die is possible before the onset of melt fracture as compared to the use of a die with parallel sides.

The ethylene polymers employed in the process of the present invention can be described as linear polymers in the sense that any branching that occurs in the polymer is essentially a function only of the type and concentration of the comonomer(s) that may be employed with the ethylene in making the polymers. No such comonomers are employed, of course, in making the homopolymers.

The shear rates employed in the process of the present invention are in the range of up to about 200 sec.$^{-1}$, and may be in the range of up to about 100 sec.$^{-1}$. This shear rate is that as measured at the exit of the die.

The polymer is processed through the die at flow rates of about 5 to 15, and preferably of about 8 to 12, pounds of resin per hour per inch of die circumference. When employing, in the process of the present invention, an ethylene-butene copolymer prepared as described above, and having a melt index of about 2, a density of about 0.92 and a Mw/Mn in the range of 2.2 to 4.1, and heated to a melt temperature of about 410° F., such polymers may be readily processed in the process of the present invention at a shear rate of about 83 sec.$^{-1}$ with a good balance of fabrication performance while minimizing melt fracture at a flow rate of about 10 lbs. of resin per hour per inch of die diameter if there is employed, as the die, one having a die gap of about 0.085 inches and a configuration as shown in FIG. 2 of the drawings wherein die lip e is 0.25 inches, die lip f is 0.5 inches, die land g is 0.5 inches and land entry h is 0.50 inches. The gap width at die land g is 0.040 inches, and this provides some additional back pressure to improve gauge (of the film) uniformity. The angle of divergence at die lip f is about 5°.

EXAMPLE 13

The extrusion process of the present invention may also be used to form pipe. Pipe was formed in such process employing the copolymer of Example 2. The pipe was formed by extruding said polymer, at a melt temperature of 335° F., and at a rate of production of 8.0 pounds of resin per hour per inch of die, without melt fracture into pipe that had an internal diameter of ½ inch and a wall thickness of 20 mils. The die employed was an annular die, as shown in FIG. 2 of the drawings, which had an outer diameter of 1.78 inches, and wherein die land g = 0.5" (with a die gap at g of 0.040"), die lip f = 0.3" (with an angle of 13° at f) and die lip e = 0.2" (with a die gap of 0.110" at e).

The polymers used in all of the Examples had a melt flow ratio value of about 25.4.

The polymers which may be used in the present invention also include those which can be made with catalysts having the compositions described above and which are as formed by a ball milling process or a spray drying process. The ball milled catalysts are disclosed in U.S. patent application Ser. No. 085,313 filed Oct. 26, 1979. The spray dried catalysts are disclosed in U.S. patent application Ser. No. 095,010 filed Nov. 28, 1979. Polymers which may be employed in the process of the present invention when made with such catalysts include the copolymers, including terpolymers disclosed in U.S. patent application Ser. No. 049,555 filed June 18, 1979. The disclosures of these three patent applications are also included herein by reference.

The ethylene polymers made with the ball milled catalysts will have a molecular weight distribution, Mw/Mn, of about ≧3.0 to ≦6.0, which corresponds to a melt flow ratio of about ≧26 to about ≦40.

What is claimed is:

1. A process for reducing the melt fracture during extrusion of a molten narrow molecular weight distribution linear ethylene polymer under conditions of flow rate and melt temperature which would otherwise produce higher levels of melt fracture, which comprises extruding said polymer through a die having a die gap greater than about 50 mils and wherein at least a portion of one surface of the die lip and/or die land in contact with the molten polymer is at an angle of divergence or convergence relative to the axis of flow of the molten polymer through the die.

2. A process as in claim 1 wherein the die gap is greater than about 50 mils to about 200 mils.

3. A process as in claim 1 wherein at least a portion of the surface of the die gap and/or die land is at a divergent angle relative to the axis of flow of the molten polymer.

4. A process as in claim 3 wherein the divergent angle is from 1° to about 45° relative to the axis of flow of the molten polymer.

5. A process as in claim 1 wherein at least a portion of the surface of the die gap and/or die land is at a convergent angle relative to the axis of flow of the molten polymer.

6. A process as in claim 5 wherein the convergent angle is from about 5° to about 50°.

7. A process as in claim 1 wherein the ethylene polymer is formed into blown film.

8. A process as in claim 1 wherein the ethylene polymer is slot cast into film.

9. A process as in claim 1 wherein the ethylene polymer is formed into pipe.

10. A process as in claim 1 wherein the ethylene polymer is a low density ethylene hydrocarbon copolymer.

11. A process as in claim 10 in which said copolymer is a copolymer of ethylene and at least one $C_3$ to $C_8$ alpha olefin having a melt index of about $\geq 0.1$ to about $\leq 20$.

12. A process as in claim 11 in which said copolymer is a copolymer of $\geq 90$ mol percent ethylene and $\leq 10$ mol percent of at least one $C_3$ to $C_8$ alpha olefin.

13. A process as in claim 12 in which said copolymer has a molecular weight distribution of about $\geq 2.7$ to $\leq 6.0$ and a total unsaturation content of about $\geq 0.1$ to $\leq 0.3$ C=C/1000 C atoms.

14. A process as in claim 12 in which said copolymer has a melt flow ratio of about $\geq 22$ to $\leq 40$ and a total unsaturation content of about $\geq 0.1$ to $\leq 0.3$ C=C/1000 C atoms.

15. A process as in claim 1 wherein said ethylene polymer is extruded through said die at a shear rate, at the exit of said die, of up to about 200 sec.$^{-1}$.

16. A process as in claim 15 wherein said ethylene polymer is extruded through said die at a shear rate, at the exit of said die, of up to about 100 sec.$^{-1}$.

* * * * *

UNITED STATES PATENT AND TRADEMARK OFFICE
CERTIFICATE OF CORRECTION

PATENT NO. : 4,282,177
DATED : August 4, 1981
INVENTOR(S) : S. J. Kurtz et al.

It is certified that error appears in the above—identified patent and that said Letters Patent is hereby corrected as shown below:

Column 10 line 19 after "about" delete the rest of the line and substitute --0.02 to about 0.04 inches in diameter. The- -

Column 22, line 50 change "1.67" to "1.47"

Signed and Sealed this

Fifth Day of January 1982

[SEAL]

Attest:

GERALD J. MOSSINGHOFF

Attesting Officer  Commissioner of Patents and Trademarks